United States Patent [19]
McLeod

[11] Patent Number: 5,873,226
[45] Date of Patent: Feb. 23, 1999

[54] MCLEOD HARVESTING SYSTEM AND METHOD

[75] Inventor: Robert H. McLeod, Winnipeg, Canada

[73] Assignee: Bob McLeod Inc., Winnipeg, Canada

[21] Appl. No.: 742,635

[22] Filed: Nov. 1, 1996

[51] Int. Cl.$^6$ ................................................. A01D 41/06
[52] U.S. Cl. ............................... 56/14.6; 56/122; 460/65; 460/79; 460/97
[58] Field of Search .................................... 56/14.6, 14.5, 56/194, 122, DIG. 1, DIG. 2; 460/23, 65, 75, 59, 79, 97, 85, 111, 112, 118, 119, 149, 150, 903

[56] References Cited

U.S. PATENT DOCUMENTS 3,580,257  5/1971  Teague ........................................ 460/85

FOREIGN PATENT DOCUMENTS

| | | |
|---|---|---|
| 638703 | 3/1962 | Canada ..................................... 460/65 |
| 1047876 | 2/1979 | Canada . |
| 1053528 | 5/1979 | Canada . |
| 1094904 | 2/1981 | Canada . |
| 1112975 | 11/1981 | Canada . |
| 1952567 | 6/1971 | Germany ............................ 56/16.4 D |
| 3528638 | 2/1987 | Germany ................................ 56/14.6 |
| 1036293 | 8/1983 | U.S.S.R. ................................ 56/14.6 |
| 1261579 | 10/1986 | U.S.S.R. ................................ 56/14.6 |
| 1496684 | 7/1989 | U.S.S.R. ................................ 56/14.6 |

Primary Examiner—Terry Lee Melius

[57] ABSTRACT

A harvesting method gathers and threshes grain in the field, leaving behind the straw. It removes chaff and weed seeds from the field with the harvested grain, and separates the chaff, grain leavings and weed seeds from the grain in a separate yard plant. The chaff, grain leavings and weed seeds are compacted and crushed in a mill for use as animal feed. The simplified harvest units have augmented holding tanks, one version of which can be attached to (and detached from) existing farm tractors. An automated integrated yard plant (1) separates and cleans harvested grain and (2) compacts and crushes chaff, grain leavings and weed seeds for use as animal feed.

18 Claims, 12 Drawing Sheets

MCLEOD HARVESTING SYSTEM AND METHOD

This invention concerns a harvesting system and method designed to simplify and improve existing grain crop harvesting techniques. The method threshes the harvested material and separates straw (or its equivalent) in the field from chaff, grain, grain leavings and weed seeds. The straw is spread back onto the field. The materials other than straw are transported to an automatic cleaning plant. Here the grain is separated and cleaned and the separated chaff is crushed, torn and densified and the grain leavings and weed seeds are also compacted and crushed in a single step for use as animal feed. The system includes a simplified harvester, and a single device processing plant, which separates the grain and densifies chaff and destroys weed seeds. Grain leavings include small kernels, cracked or split kernels, fines, leaves, hulls, stalks, stems, and the like, and are distinct from chaff. Chaff, grain leavings and weed seeds are present in dockage, the material other than grain from the combine harvesting process. Chaff, grain leavings and weed seeds are clearly visibly different from each other and grain.

Although the invention is described and referred to specifically as it relates to specific structures and methods for grain harvesting, it will be understood that the principles of this invention are equally applicable to similar structures and methods and accordingly, it will be understood that the invention is not limited to such structures.

BACKGROUND OF INVENTION

At present grain harvesting is carried out using combine harvesters, which thresh the grain in a threshing cylinder or rotor then separate out the grain from chaff, grain leavings, straw and weed seeds. The combine harvester keeps the grain and rejects the other material, which is left on the field. Its thresher breaks the grain from the stalk or pod. A degree of separation is achieved in rotary threshers by using apertures in the thresher tube which allow passage of grain. However the combine's separation process is not totally efficient, the straw portion includes grain, grain leavings, and chaff, and the grain portion includes chaff, grain leavings and straw. The straw portion is then usually passed along a straw walker to remove more grain from the straw. When the thresher is a cylinder and a concave, the concave has apertures to pass the grain portion, but again the straw portion is usually passed along a straw walker to remove additional grain from the straw. The grain portion, which in combines includes chaff, grain, grain leavings and weed seeds, are then passed through a sieve with air blowing upwards. This is called the shoe and includes the aspiration (blowing) and sieve (cleaning) apparatus. The grain falls downward, while chaff, grain leavings and weed seeds and any straw are blown upward. Chaff, grain leavings, straw and weed seeds are left as waste by-products in the field, while the grain is transported to storage. Thus the economic value of chaff, grain leavings and weed seeds for animal feed is lost. Moreover the present combine method spreads weed seeds through the fields, necessitating intensive, extensive and expensive pesticide and herbicide applications, whereas the new method collects chaff and weed seeds. The weed seeds are crushed thereby releasing their nutrients into chaff for animal feed.

The problem with chaff (and grain leavings and weed seeds) is simply that the farmer has enough problems at harvest without trying to handle chaff in addition to grain. The time and labor required to gather chaff, haul it to the farmyard and then mill it to destroy weed seeds are commonly just not available. Chaff on mixed farms is either browse fed in field or feedlot without milling. Weed seeds are spread through manure, and weed control is lost.

Other advantages of the new method compared to the present combining method are in a cleaner grain product, providing farmers with less dockage, higher prices and less freight demurrage. Total harvesting equipment will be less costly. Equipment depreciation is less because the automatic cleaning plant is separate and incurs less wear. The field unit is simpler because it has none of the cleaning and separating equipment of the combine. At present prices the yard plant and associated harvester together cost less than a new combine harvester.

Although the term 'grain' is primarily regarded as cereal grain referring to the seeds of grasses including many domesticated species, it is not limited thereto in instant application, since combine harvesters may be used as well for oilseeds, legumes and other domesticated plants. The term 'grain' is herein intended to cover besides the usual definition, all crops harvestable by combine harvesters, especially but not limited to all prairie crops including small grains, and specifically including the major popular crops of alfalfa, barley, beans, buckwheat, canola, clover, corn (maize), flax, grass (most varieties), lentils, lespedeza, millet, mustard, oats, (edible) peas, rice, rye, sorghum, soybeans, sunflower, (birdsfoot) trefoil, vetch, and wheat, which are regularly harvested by combines. As those in the art appreciate the above list is indicative rather than restrictive in nature, and other crops harvestable by combine harvester are covered by the term 'grain' as understood in the broad sense. The present invention is applicable to all combine harvestable crops which are referred to as 'grain' herein.

The new method has several substantial advantages over current practice. At present combines harvest grain, and there is no alternative. A combine's equipment cost can exceed US $150,000. Under the new method the two unit equipment cost is US $95,000. The two units can be traded independently, thus giving farmers more flexibility in purchase decisions.

An environmental goal is to add value to waste. Chaff is currently left on the field as waste. Tests show chaff can be removed with no detrimental effects to soil. Chaff has value as animal feed (worth US $7.50 per acre). The new method removes chaff from the field cost effectively. There are other chaff collection methods available which are expensive, awkward, require more labor, but are not in common use.

Removal of chaff results in field advantages. Chaff rows, which may adversely affect minimal till seeding, are eliminated. Fertilizer application is often prevented from entering the soil by crop residue, which is mostly chaff by volume. The new method's removal of crop residue other than straw gives a cleaner field.

The new method produces cleaner grain reducing grain dockage and freight demurrage.

Grain loss from the combine's shoe is eliminated, which recovers an average of 1 to 2% more grain than conventional combine methods, which is a saving of about US $1,500 for a 700 acre field.

Combines return and spread weed seeds on the field creating weeds and weed patches. The new method doesn't spread weed seeds by collecting up to 250,000 weed seeds per acre with the chaff, thereby lowering pesticide (herbicide) and tillage requirements. The collected weed seeds are crushed in the method's yard plant, and their fat and protein adds to the collected chaff's feed value.

Volunteer growth is greatly reduced, both by decreasing grain loss and by collecting chaff. In dry years the small grain kernels, formerly left on the field, are collected with the chaff and enhance its feed value.

The new method is efficient. The field, or harvesting unit's has a larger grain bin (up to about three to four times as large as the combine's grain bin) and need be emptied every 10 acres, as opposed to 6 acres for a combine, even though the unit is collecting more material from the field. Since the yard plant has a consistent throughput, the grain cleaning unit, which is preferably electric, operates automatically, and can be left unattended. There is no need to keep up with the field harvesting process, as grain can be cleaned 24 hours per day.

The yard plant preferably contains a specifically designed roller mill which densifies the chaff, enhancing its value for transport and sale to feed lots.

A grain dryer can easily be incorporated into the yard plant.

PRIOR ART

Applicant is unaware of any closely related prior art.

It is a principal object of the invention to harvest all, or as many crops, as possible. It is a further principal object to reduce grain loss during harvesting. It is a further principal object to provide a cleaner grain product. It is a further principal object to remove chaff, grain, grain leavings and weed seeds from the harvested field. It is a further principal object to leave only straw in the harvested field. It is a further principal object to use compacted and crushed chaff and weed seeds as animal feed, especially for stock raising especially cattle. It is a further principal object to provide chaff nutritionally enhanced by the nutrients from crushed weed seeds and crushed grain leavings. It is a subsidiary object to remove undersized grain kernels, fines and other grain leavings from the harvested field, and to unite these with the chaff and weed seeds as animal feed. It is a further subsidiary object to provide a lighter, faster, more energy efficient, simpler and less expensive field harvester with greater capacity. It is a further subsidiary object to increase the use and hence productivity of farm grain trucks. It is a further subsidiary object to use an automatic, separate, cleaning plant, which is both more efficient in cleaning and more energy efficient than the mobile fuel powered combine cleaning plant. It is a further subsidiary object to reduce volunteer grain growth. It is a further subsidiary object to collect and destroy weed seeds from the harvested field, and reduce weed infestation. It is a further subsidiary object to reduce pesticide and herbicide use. It is a further subsidiary object to reduce fertilizer use. It is a further subsidiary object to provide animal feed for stock raising especially cattle. It is an all embracing object of the invention to increase farm income. It is an all embracing object of the invention to reduce farming costs, which all of the above listed objects individually achieve. Further subsidiary objects are lower equipment costs and associated depreciation costs, lower fuel costs, elimination of chaff, and cleaner fields. Other objects will be apparent to those skilled in the art from the following specification, accompanying drawings and appended claims.

DESCRIPTION OF THE INVENTION

The project follows three years of work. An economic study including patent and literature searches, obtaining learned comments, preliminary economic analysis, costing and layouts has been performed. Over 900 titles and abstracts were reviewed. Applicant found no other party working on a system and method to separate straw on the field and bring all other crop material back to a separate farm plant for further processing. A prototype full sized yard plant including the cleaning unit has been designed, built and tested.

There is research activity relating to certain areas of the method, for example: the value of weed removal (Entz, University of Manitoba); the value of chaff collection (Strumburg, Agri-Food Canada at Swift Current); air flow pressures for moving grains (Sokhansanj, University of Saskatchewan). There is however no research being undertaken for a comparable new harvesting technology. Contact has been made with universities (North Dakota, South Dakota State, Minnesota, Iowa State, Montana, Alberta, Saskatchewan, Manitoba), equipment institutes (Prairie Agricultural Machinery Institute, Alberta Farm Machinery Institute, Saskatchewan Research Council), government (Agri-Food Canada, Prairie Farm Rehabilitation Administration, and the provinces of Manitoba, Saskatchewan, Alberta), other organizations (Manitoba Hydro, Transalta Utilities, the U.S. National Food and Energy Council, U.S. Electric Power Research Institute, United Grain Growers) and farm organizations (Manitoba Cattle Producers, Western Canadian Wheat Growers, Zero Till Association, Keystone Agricultural Producers). More than 200 acknowledged specialists in their fields have been consulted. All are unaware of similar research.

Manitoba Hydro, the Agricultural Technology Alliance of the Electric Power Research Institute (U.S.), and the Canada-Manitoba Agricultural Sustainability Program provided financial research assistance, while the Western Canadian Wheat Growers Association and Manitoba Cattle Producers provided research assistance.

In one broad aspect the invention is directed to a method of harvesting field crops comprising the step of treating a chaff, grain leavings and weed seeds portion of a field crop, including substantially all the chaff, grain leavings and weed seeds of the field crop, to compact and tear the chaff and compact and crush the grain leavings and weed seeds, which may be then treated with anhydrous ammonia. Preferably the tearing, compacting and crushing is performed by milling. Grain can be added at the milling stage to enrich the resulting mixture. Previously a chaff, grain, grain leavings and weed seeds portion of a field crop is separated into two portions, a grain portion including substantially all the grain, and a chaff, grain leavings and weed seeds portion including substantially all the chaff, grain leavings and weed seeds. Previously a cut threshed field crop is separated into two portions, a straw portion including substantially all the straw, and a chaff, grain, grain leavings and weed seeds portion including substantially all the chaff, grain, and weed seeds. Previously the field crop is cut, then threshed.

In another broad aspect, the invention is directed to a method of harvesting field crops comprising the steps of cutting a field crop, then threshing the cut crop, followed by separating the threshed crop into a straw portion including substantially all the straw, and a chaff, grain, grain leavings and weed seeds portion including substantially all the chaff, grain, grain leavings and weed seeds. The straw portion may be deposited on the field for baling, or it may be chopped, shredded and spread on the field for decomposition. The chaff, grain, grain leavings and weed seeds portion is then transported to a separate plant, where it is separated into two portions, a grain portion including substantially all the grain, and a chaff, grain leavings and weed seeds portion including substantially all the chaff, grain leavings and weed seeds, this portion may be then treated with anhydrous ammonia.

The chaff, grain leavings and weed seeds portion is then treated to compact and crush the chaff, grain leavings and weed seeds, preferably by milling, after which it may be treated with anhydrous ammonia.

In another broad aspect the invention is directed to a method of harvesting field crops comprising the step of separating a chaff, grain, grain leavings and weed seeds portion of a field crop including substantially all the chaff, grain, grain leavings and weeds seeds of the field crop, into a grain portion including substantially all the grain, and a chaff, grain leavings and weed seeds portion including substantially all the chaff, grain leavings and weed seeds.

In a further broad aspect the invention is directed to a method of harvesting field crops comprising the step of separating a cut threshed field crop into two portions, a straw portion including substantially all the straw, and a chaff, grain, grain leavings and weed seeds portion including substantially all the chaff, grain, grain leavings and weed seeds.

In a further broad aspect the invention is directed to an improved method of harvesting field crops the providing the step of collecting substantially all chaff, grain leavings and weed seeds with the grain in the absence of collecting straw. More preferably the collected chaff, grain, grain leavings and weed seeds are transported to a separating plant. Preferably the field crop is previously cut, threshed, then separated into two portions, a straw portion including substantially all the straw, and a chaff, grain, grain leavings, and weed seeds portion including substantially all the chaff, grain, grain leavings and weed seeds. More preferably subsequently the collected chaff, grain, grain leavings, and weed seeds portion is subsequently separated into two portions, a grain portion including substantially all the grain, and a chaff, grain leavings and weed seeds portion including substantially all the chaff, grain leavings and weed seeds. The chaff, grain leavings and weed seeds portion may be treated with anhydrous ammonia. The chaff, grain leavings and weed seeds portion, may be treated to tear and compact the chaff, and crush and compact the grain leavings and weed seeds, and then treated with anhydrous ammonia.

A substantial advantage of collecting the chaff and grain leavings with the threshed grain lies in ease of material handling. This is an advantage in both the field harvesting unit and later. Chaff and grain leavings must be united with the threshed grain for ease of handling. Threshed grain kernels flow like a liquid or fluid. Chaff alone doesn't flow well and tends to bridge. Grain leavings also don't flow well alone. Grain kernels are flowable or pourable, which can thus be moved by auger. Since chaff and grain leavings tend to bridge when passing through narrow openings, they must be mixed with flowable or pourable material for ease of handling. The only practical way to move chaff and grain leavings is when mixed with threshed grain, which is flowable or pourable. Unthreshed grain, heads or ears, does not flow well. For grain and by-products to be easily handleable, the grain must be threshed and the by-products must be mixed in with the grain. Straw also does not flow alone. In practice the grain is best threshed in the field, then the flowable mixture of chaff, grain, grain leavings and weed seeds transported elsewhere for cleaning and separating. To further improve viscosity and assist with the flow of material to be moved, simple agitating devices can be added to the system at points where the material flows from one space to another.

Another advantage of having the chaff, grain, grain leavings and weed seeds mixed together, when removed from the field, is the heavy grain (60 bs/cu. ft.) helps compress the relatively light (4.5 lbs/cu. ft.) chaff and grain leavings mixture. Tests demonstrate that the compression factor is typically about 69 to 70% of the volume of the grain and the chaff and grain leavings (and weed seeds) removed from the field independently.

In a further broad aspect the invention is directed to animal feed comprising chaff, grain leavings and weed seeds. The chaff, grain leavings and weed seeds may be treated with anhydrous ammonia, which substantially enhances the nutritional value of the chaff, and when effectively applied kills weed seeds. When the chaff is torn and compacted and the grain leavings and weed seeds are compacted and crushed, the nutrients of the crushed grain leavings and weed seeds enhance the nutritional value of the chaff. The torn and compacted chaff and compacted and crushed grain leavings and weed seeds may be further be treated with anhydrous ammonia. Grain may be added to the chaff, grain leavings and weed seeds to enrich the product.

Previously grain is first cleaned in the combine, then cleaned again elsewhere (elevator, cleaning mills and the like). Now using the invention the grain is not first cleaned in the combine, the harvested grain, chaff, etc., mixture is instead cleaned outside the combine to superior standards compared to the combine. The cleaning system of the invention handles a different mixture from other cleaning plants.

DESCRIPTION OF THE PREFERRED EMBODIMENTS

Figure 1:
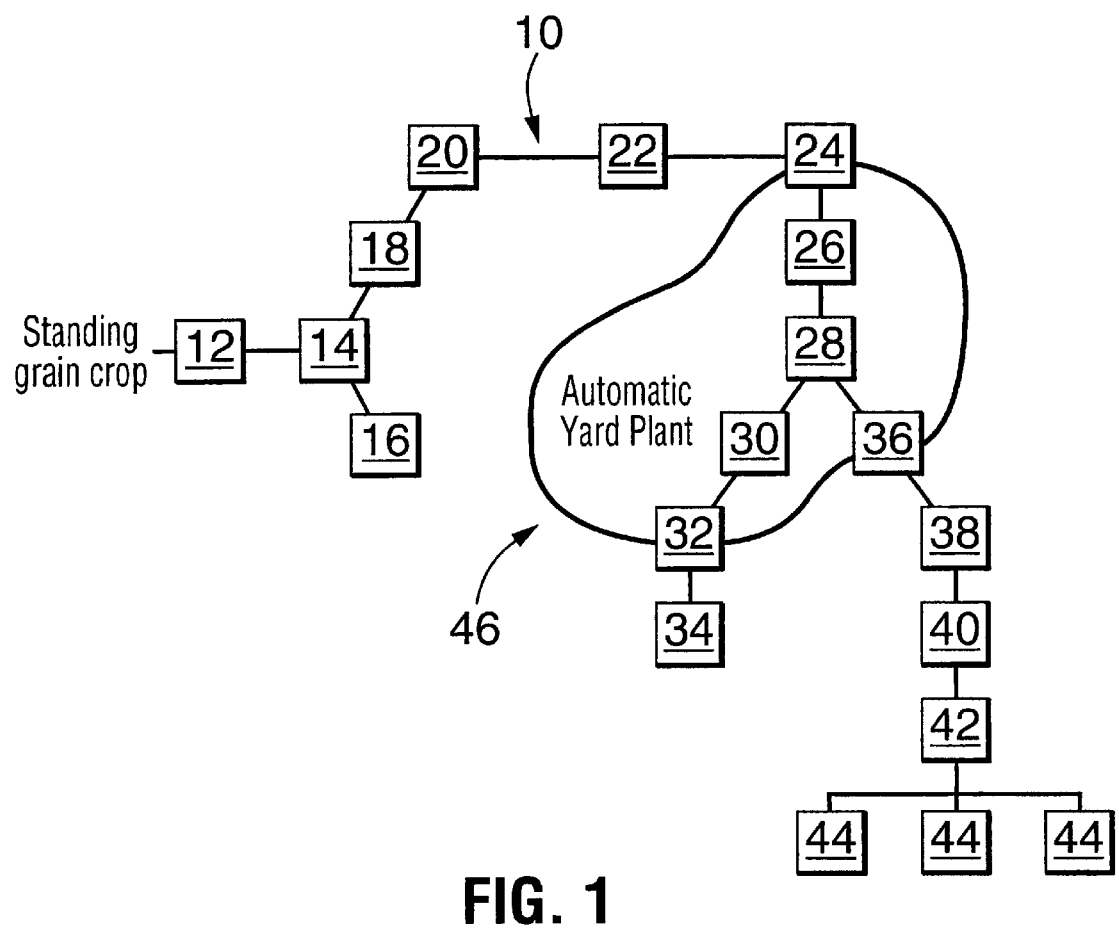
FIG. 1 shows a flow chart to illustrate an embodiment of the system of the invention.

The invention is now illustrated by reference to the preferred embodiments thereof. The numeral 10 generally indicates a system of the invention (FIG. 1), header 12, which may pick up a swath, direct-cut or strip-cut the standing grain crop. The header cuts the crop leaving behind stubble at a height chosen by the farmer. Harvester 14 is directly attached to header 12, and includes a thresher to thresh the grain. The grain, chaff, grain leavings and weed seeds proceed together into a holding tank integral with the harvester, desirably with a bottom agitator to help flow from the tank. The holding tank is preferably at least about twice up to about three or four times the size of those currently in use on combines. The separated straw is may be passed by overshot beater 159 into tine separator 160, which has paired side by side tine separators containing tine rotors 161 having tine arrays 162 thereon. Material is urged along the tine separators smaller material than straw passing through gratings 164 into holding tank 138, emptied by unloading auger 144. In wrap-around 230, straw and other material is passed by overshot beater 159 onto straw walker 232, which is about fifteen feet long, allowing material other than straw to fall into collection tank 234, as does material passing through concave 158. Bottom auger array 236 in collection tank 234 urge the material other than straw to transverse auger 238 which carries it to elevator 240. At the top of elevator 240, transverse auger 242 carries the material other than straw into grain bin 138, separated from collection tank 234 by internal wall 237. Grain bin 138 has bottom transverse auger 244, which carries material to the base of unloading auger 144. Grain bin 138 also has bottom auger array 246 to urge material to transverse auger 244, there are also top leveling augers 248, transverse, and 250, longitudinal. Wrap-around 230 is attached to tractor 148 by triple hitch 252. Tractor PTO 254 drives shaft 256 and gearbox 258, which drives all the moving parts through a system of shafts, belts and sheaves. Elevator 134 is driven by shaft 260, which through a belt and sheave system also drives thresher 156 and overshot beater bar 159, elevator 240 and straw spreader 142. Elevator 134 and header 132 are raised and lowered by hydraulic cylinders 262 which are attached to the elevator by front cylinder supports 264 and to outside of grain bin 138 by cylinder supports 266. Elevator 134 has elevator frame 268, enabling support wheel 202 and support wheel axle 270 to support elevator 134. Wrap-around 230 is about 13 feet wide, 22 feet long and 12 feet high, not including unloading auger 144, it has a total capacity of some 1179 cubic feet or approximately 950 bushels. The wrap-around versions 146, 166, 200, 216, are mounted on conventional tractor, 148, and operated by the usual tractor PTO (power take-off), deposited in the field at the farmer's pleasure either directly as threshed for baling, or optionally through straw chopper, shredder and spreader 16 to decompose in the field.

Built into harvester 14 is high volume and time saving auger 18, which is used to load field truck 20. As truck 20 preferably has truck box sides raised by about 3 feet above normal to increase load capacity, the auger arm is raised to clear these. Wheat chaff, weed seeds and wheat grain are considered to have about twice the volume of wheat grain alone, and about 1.16 times the weight of wheat grain alone. Volume and weight ratios vary with crop harvested and moisture content, as those skilled in the art are aware.

Figure 10:
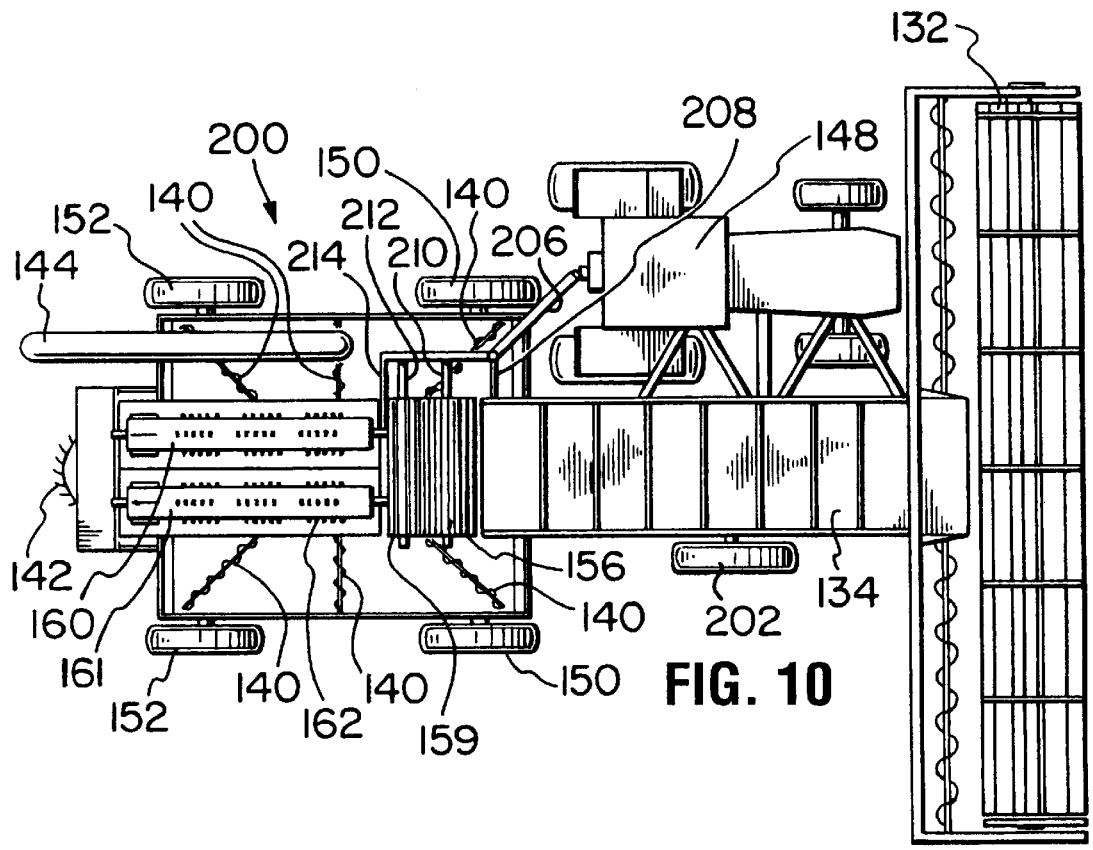
FIG. 10 shows a top part sectional view of the embodiment of FIG. 9.
Figure 9:
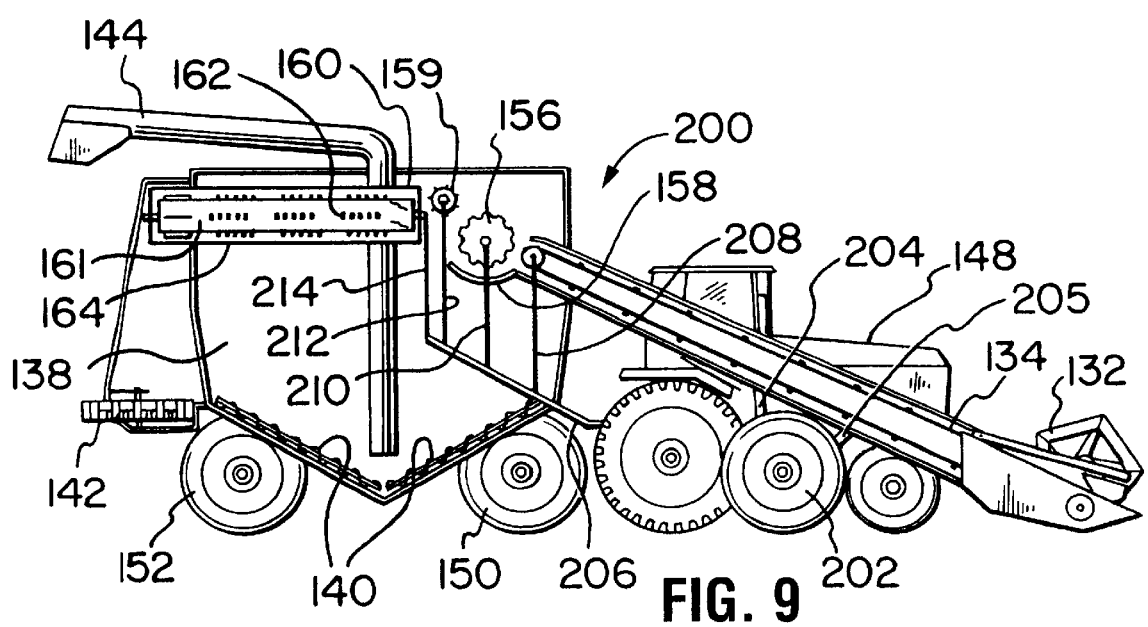
FIG. 9 shows a side part sectional view of another embodiment of a wrap-around thresher of the invention.

FIGS. 3 to 6, 9 to 11, and 15 to 17 indicate specific threshers: self-propelled thresher 130, (FIG. 3), self-propelled thresher 154 (FIG. 4), wrap-around thresher 146 (FIG. 5), wrap-around thresher 166 (FIG. 6), wrap-around thresher 200 (FIGS. 9 and 10), wrap-around thresher 216 (FIG. 11) and wrap-around thresher 230 (FIGS. 15 to 17), which have conventional interchangeable header 132, which as those skilled in the art realize can be a direct cut, swath pick-up, or stripper header. Elevator 134 carries the cut crop to rotary thresher 136, or thresher cylinder 156 and cooperating concave 158, which separates the straw from the rest of the crop. In the self-propelled versions of the thresher, 130 and 154, elevator 134 is 64½ inches wide as are rotary thresher 136, or thresher cylinder 156 and concave 158. In the wrap-around versions elevator 134 is 55 inches wide as are rotary thresher 136, or thresher cylinder 156 and concave 158. Either rotary thresher 136, or concave 158 may include apertures to allow grain and other material except straw to pass directly into holding tank 138. Material other than straw may be carried by conveyor augers 137 to holding tank 138, optionally equipped with agitators 140. Straw and other material mixed therewith which requires about 200 H.P. In FIGS. 9 and 10, the tractor PTO operates shaft 206 which powers elevator 134, thresher cylinder 156, overshot beater 159 and tine rotors 161 by gear belt drive (also known as HDT, timing belt, or poly-chain) through belt and sheave arrangements 208, 210, 212, and 214. In version 200 (FIGS. 9 and 10), a support wheel 202 with support struts 204 and 205 is provided for elevator 134. In all versions straw spreader 142 spreads straw on the field. These threshers all feature a large holding tank and lack grain cleaning equipment, except 216.

Figure 11:
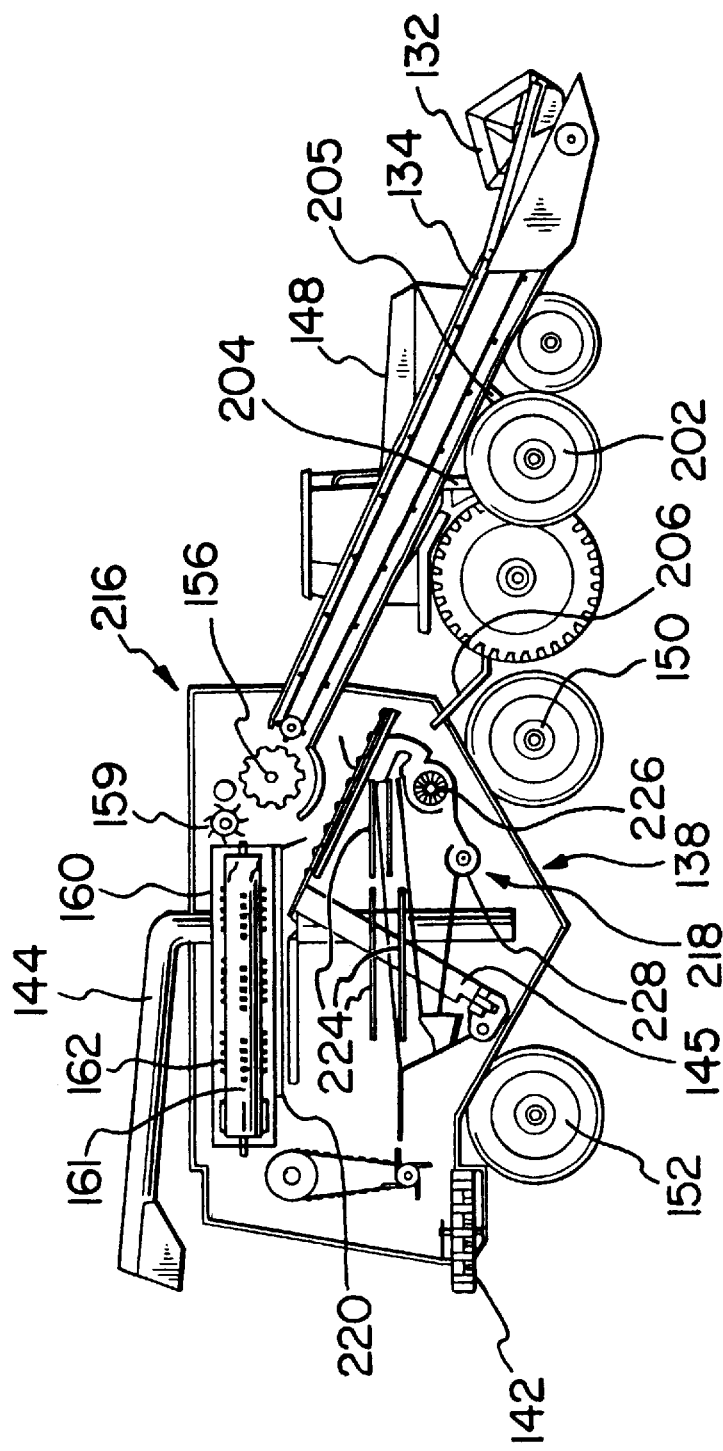
FIG. 11 shows a side part sectional view of another embodiment of a wrap-around combine of the invention.

FIG. 11 shows wrap-around combine 216, which embodies conventional combine grain cleaning equipment 218, including, screen 220, distribution auger 222, sieves 224, aspirator fan 226, which blows chaff, weed seeds and grain leavings out, and tray 228 with accompanying auger. Auger 144 is also shown in alternative nonuse position 145.

Thus far the process has harvested all the grain. Using existing combine methods substantial amounts of grain are put back on the field with the chaff, 6.4% for wheat, 5.2% for barley and 3.7% for canola, as percentages of total chaff weight. Combine grain average losses (as distinct from header grain losses) are estimated at between 3.375% to 3.75% for wheat, 3% for barley and 2.875% for canola, as percentages of total grain harvest. These losses are due to the thresher, the straw walker and the shoe (blowing aspirator and cleaning sieve). Harvester 14 of the invention doesn't have a shoe, thus saving grain loss from the shoe.

The weed seeds harvested will amount to about 50% of weed seeds available at harvest time.

Besides the value of capturing more grain, less grain loss means less volunteer growth. In addition the removal of weed seeds with the grain will substantially reduce weed growth.

Numeral 22 sets forth another high volume, time saving, auger unloads the grain truck into surge receiving bin 24, which is part of automatic yard plant 46. Surge bin 24 has a large holding capacity and preferably a bottom agitator to ensure steady flow into automatic yard plant 46. Auger 26 carries the chaff, grain and weed seeds to stationary separating and cleaning machine 28. Combine harvested grain must be cleaned again for market purposes. Machine 28 has more cleaning stages than combines, and produces a significantly cleaner product than combine harvested grain, which is typically docked by 2 to 4% for uncleaned grain. Yard cleaned grain will be 'commercial' quality, with about 1% dockage. The stationary yard cleaning machine 28 has the advantages that it is easier, simpler and cheaper to clean and maintain than the combine cleaning machine which is intricate, in a small space, awkward and expensive to repair and maintain. Because it is stationary yard cleaning machine 28 takes less shock and vibration than the combine cleaning machine, and thus lasts longer and depreciates less. Since the yard cleaning machine is built on a solid foundation it can be advantageously positioned for each individual farm. The cleaned grain is then carried by auger 36 to optional grain dryer 38, which can be incorporated into automatic yard plant 46, more easily, simply and with less labor than the present system. Grain dryer 38, when available makes drying easier and so enhances grain quality, it can also extend the harvest time. The grain whether passed through grain dryer 38 or not, is then passed to bin 40, whence it may be carried by optional auger 42, usually a stationary overhead auger, to optional storage bins 44. The grain can be advantageously directed to selected bins separately to even out moisture or quality. The residue of chaff, grain leavings and weed seeds from cleaning machine 28 is carried to crushing, tearing and densifying machine 30 preferably a hammermill, or roller mill, which tears, densifies (compacts) and crushes the chaff, preferably to double its original density, while compacting and crushing the weed seeds. The chaff may then be moved by auger 32 to chaff bunker 34, which is desirably covered by a tarp, to prevent blowing, alternatively the chaff can be moved by front end loaders.

Figure 2:
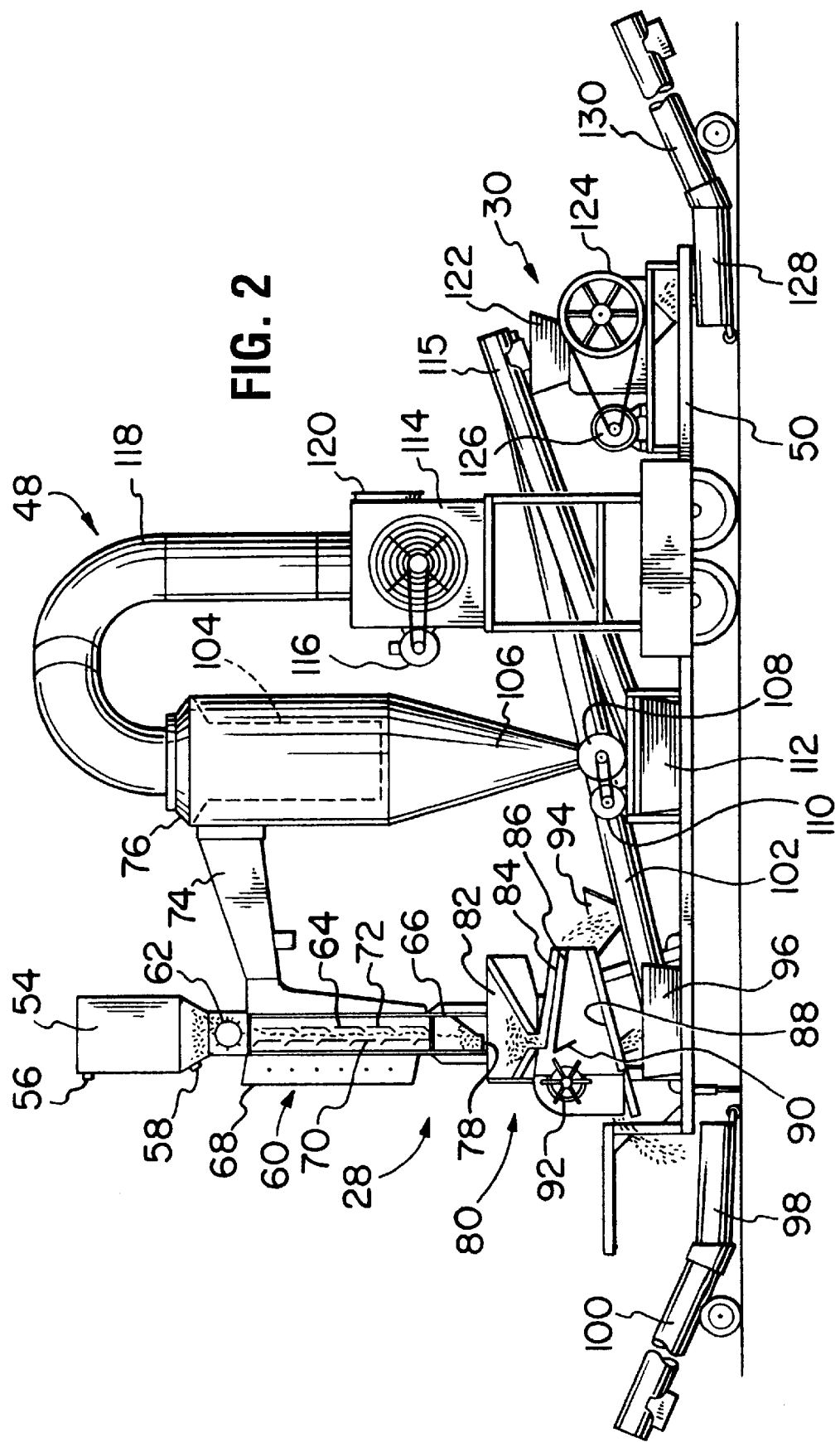
FIG. 2 shows a part sectional view of an embodiment of a yard plant cleaning and separating unit of the invention, combined with a seed crushing and chaff densifying unit, in this case the unit is mobile.
Figure 3:
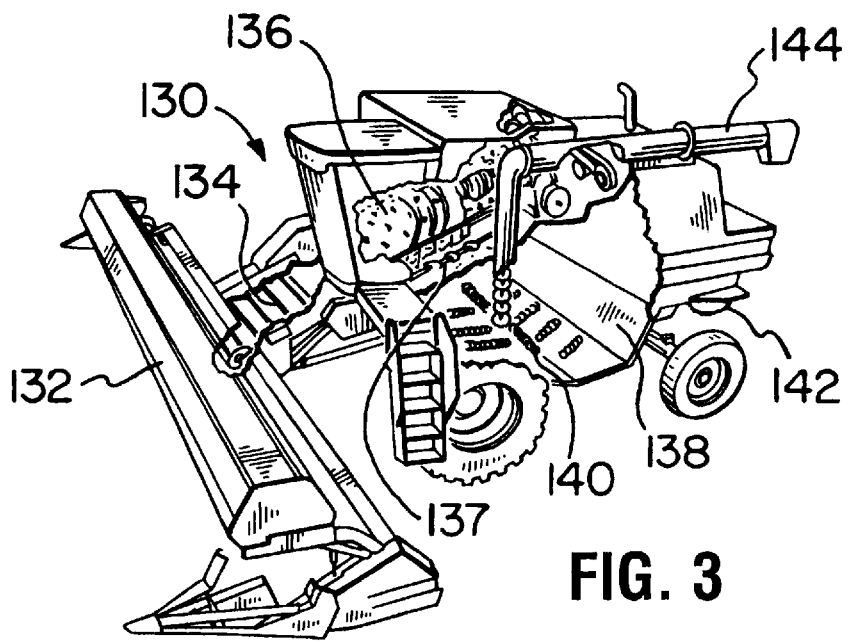
FIG. 3 shows an exploded view of an embodiment of a self-propelled thresher of the invention.
Figure 4:
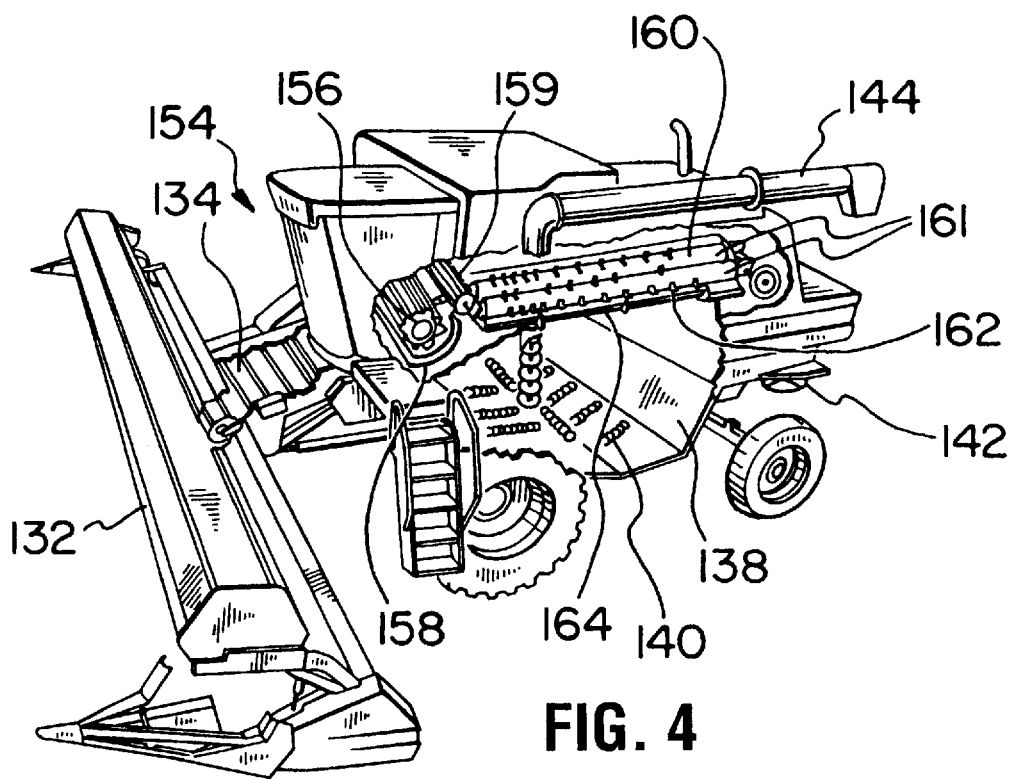
FIG. 4 shows an exploded view of an embodiment of a self-propelled thresher of the invention.
Figure 5:
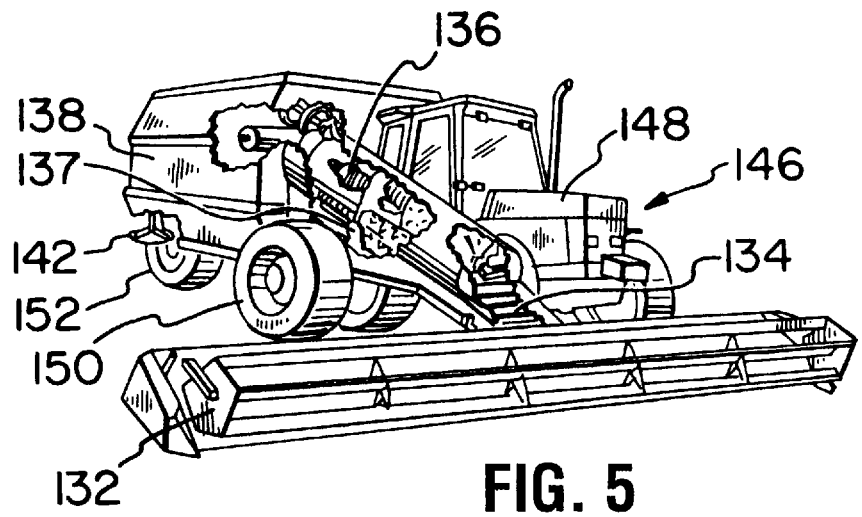
FIG. 5 shows an exploded view of another embodiment of a wrap-around thresher of the invention.
Figure 6:
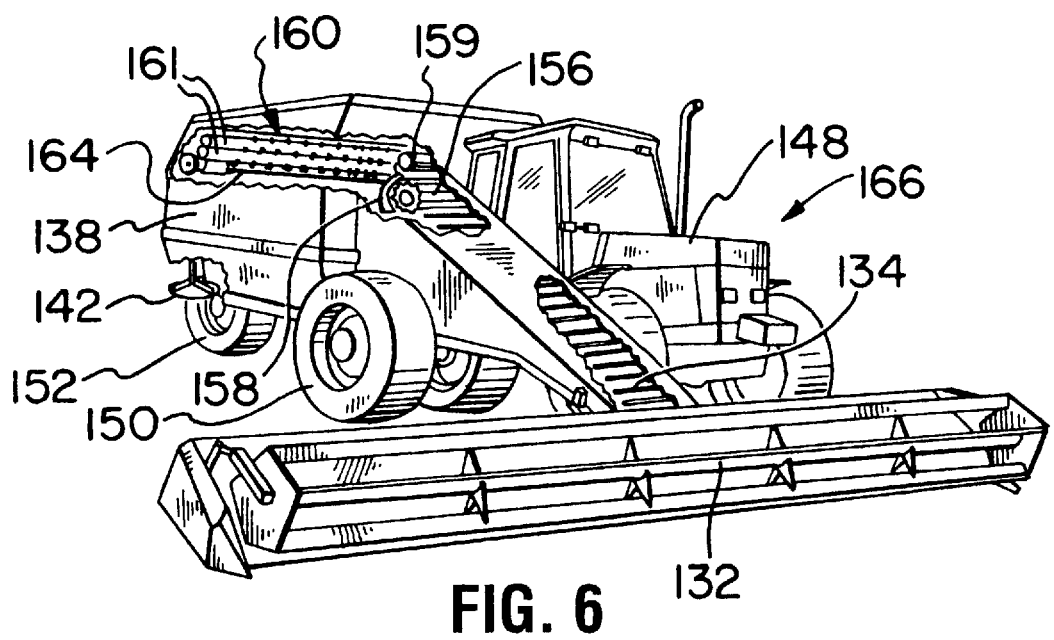
FIG. 6 shows an exploded view of another embodiment of a wrap-around thresher of the invention.

A cleaning and densifying yard plant 48 embodying cleaning/separating 28 and seed crushing/chaff tearing/densifying 30 elements is shown in FIG. 2. Plant 48 is mounted on trailer 50 and is about 17 feet high by 24 feet long and 8 feet wide. Although this particular version is mobile, so that it can be tested at a convenient construction site, before moving it elsewhere, generally the plant is intended to be stationary. Yard plant 48 in any event is intended to be used when stationary, and no provision is made for use while moving. Grain is fed into grain feed inlet 54 by auger 26 (not shown in FIG. 2). Inlet 54 has upper 56 and lower 58 level indicators (sensors), when upper indicator 56 indicates inlet 54 is full, grain flow is stopped, when lower indicator 58 indicates inlet 54 is empty grain flow is resumed. Below feed inlet 54 is aspirator 60, which has top feed roll 62 allowing grain to free fall down aspiration column 64 to base 66. Feed roll 62 is regulated to control speed of material intake into aspirator 60. Air passes in through air inlet 68 through a set of baffles 70 which force air through the falling grain and then through another set of baffles 72 aspirating light chaff, grain hulls, residual straw, grain fines into duct 74 and cyclone 76. The clean grain falls into base 66, where weighted door 78 allows grain to fall into grain cleaner 80. Aspirator 60 as shown is an open circuit vertical drop aspirator with a six pass aspiration column having a 56×12 inch opening and a 7 foot vertical drop. Operating about 5,600 cfm it can handle about 700 bushels or 19 metric tons per hour of whole grain, chaff and seeds. Feed roll 62 is driven by a 1 H.P. electric motor. Cleaner 80 has top hopper 82, which gravity feeds grain onto upper scalping screen 84, which passes grain and retains large material, the grain then falls onto lower scalping screen 86 which again passes grain but retains material larger than grain but smaller than the holes in screen 84. The grain then falls onto fine screen 88, which doesn't pass grain but does pass finer material. The grain during falling is deflected by deflector plate 90 while fan 92 passes an air current through it blowing lighter material clear of the grain. This material emerges together with that removed by the scalper screens to fall into hopper 94. The fines fall into hopper 96, while the clean grain discharges to hopper 98 attached to auger 100. The other two discharges to hoppers 94 and 96 are removed by auger 102. Cleaner 80, which has a capacity of up to about 300 bushels or 8 metric tons per hour, has a 3 H.P. electric motor, which drives fans 92 and vibrates screens 84, 86 and 88. The aspirated material from aspirator 60 passes into cyclone 76 where it is forced around inner tube 104 spiraling downward, the centrifugal effect urges the chaff into the walls and down into cone 106. Cyclone 76 is 40 inch external diameter and stands about 11½ feet tall. At the base of cone 106 the chaff passes into airlock valve 108, which discharges into hopper 112 of auger 114. Airlock valve 108, driven by ¾ H.P. electric motor 110, has 10 inch square inlets and outlets and an eight vaned rotor. Centrifugal fan 114, driven by 7½ H.P. electric motor 116, has a capacity of 85,000 cfm, and through ducts 74 and 118 provides air for aspirator 60 and cyclone 76, it discharges through outlet 120. Augers 102 and 115 discharge the cleanings from the grain into hopper 122, which feeds into roller mill or hammer mill 124, either can be used. When mill 124, is a roller mill it is driven by 15 H.P. electric motor 126. A specific roller mill designed to crush weed seeds and tear and densify chaff has diagonally grooved rolls. The rolls are 10¾ inch diameter, with diagonal grooves, about 3/32 inch deep and about 3/32 inch wide, spaced about 5 or 6 per inch of width of the rolls. The rolls are geared to rotate at different speeds, one about 10 to 15% faster or slower than the other, typically one at about 350 RPM the other at about 400 RPM, as those skilled in the art are aware rotational speeds and ratios can be varied. The clearance between the rolls is between 3 and 10 mils (0.003 and 0.010 inch), that is they don't quite touch (a normal sheet of paper is about 4 mils), which has two main effects—crushing weed seeds and grain leavings and tearing chaff into smaller fragments. Mill 124 discharges into hopper 128 of auger 130. When seed crusher and chaff tearer/densifier 30 is a hammermill, a more powerful electric motor 126 is required up to a 15–50 H.P. motor.

Figure 7:
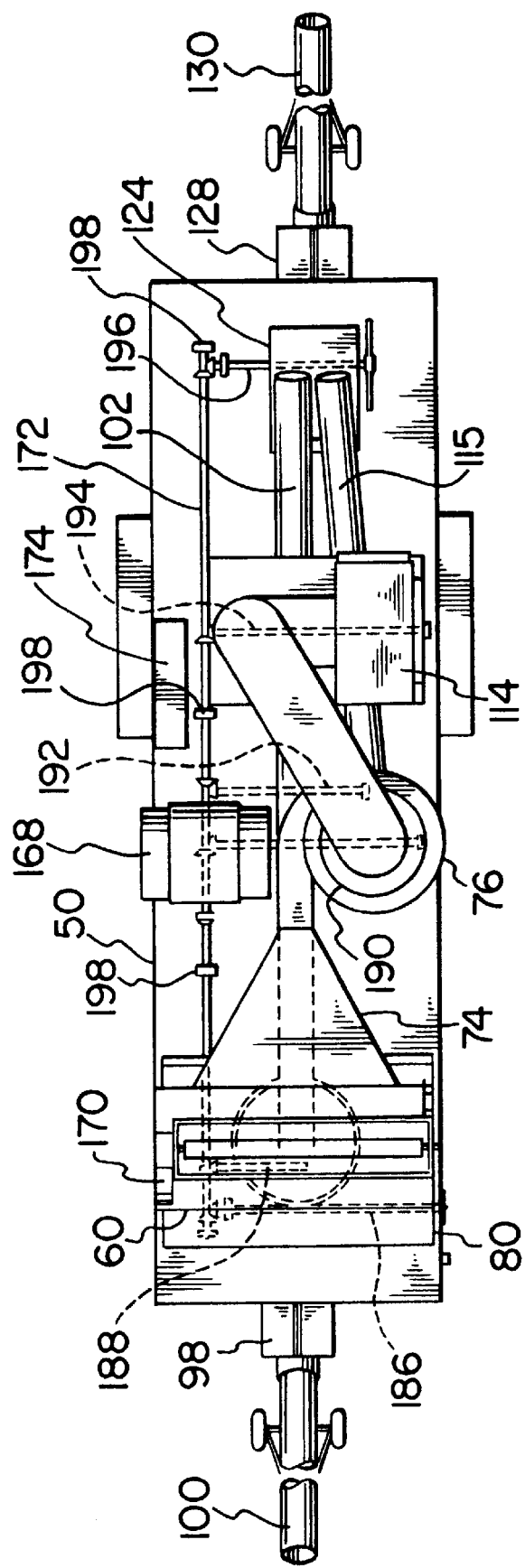
FIG. 7 shows a top view of the embodiment of FIG. 2 using a different power system.

In FIG. 7 is shown another power system for yard plant 48, in which electric motor 168, preferably a written pole motor, provides power. Most farms have single phase electric power, and triple phase power is not available, which limits the amount of electric power which can be used. The written pole electric motor has several advantages, it is a precise power single phase ride-through device, having two or four poles, it is fairly lightweight 1200 lbs, it can provide between 25 and 30 rated H.P. using single phase electric power, along a shaft running up to 1800 RPM, and is preferably used to power the plant, except motor 170 driving aspirator feed roller 62. Since feed roller 62 requires a variable drive, it cannot be run at a steady speed, and needs a separate variable speed motor. 2 inch steel line shaft 172 is connected to written pole motor 168, by a gear belt drive, (also known as HDT, timing belt, or poly-chain) at a 1:1 ratio. Bearings 198 support line shaft 172 about a foot above the deck or floor. Cleaning machine 80, airlock valve 108, aspirator fan 114, and roller mill 124 and augers 102 and 115 are connected to line shaft 172 by gear belt drives (also known as HDT, timing belt, or poly-chain) 186, 188, 190, 192, 194, and 196 which drive the devices. Each drive consists of two sheaves and a belt, set appropriately to increase or reduce RPMs for a particular drive. As those skilled in the art are aware, where the reduction of RPMs required is sufficient, a gear reduction box may be employed. As those skilled in the art are also aware a diesel motor or a tractor PTO may be used to drive line shaft 172 instead of electric motor 168, control panel 174 (described in FIG. 8) is adjacent motor 168.

Figure 8:
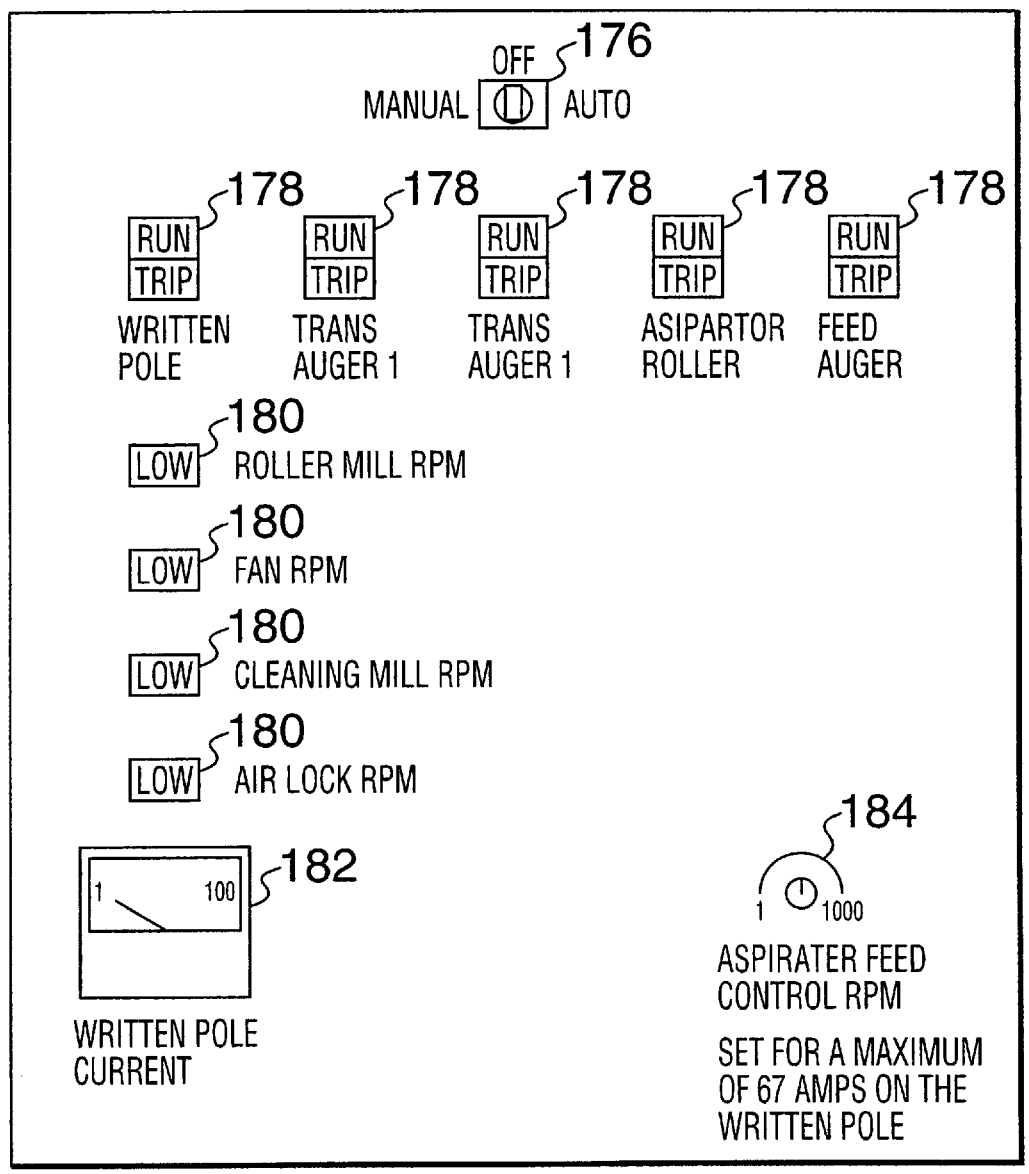
FIG. 8 shows a control panel for the embodiment of FIG. 7.

In FIG. 8 is shown control panel 174, for the written pole motor yard plant. This has manual-auto-off switch 176, push button switches having indicator lights 178, indicator lights 180, current meter 182 and aspirator feed control 184. The control panel works as follows in when switch 176 is in auto mode the written pole motor 168 starts and drives rolling mill 124, air lock valve 108, fan 114, and cleaning machine 80. Twenty seconds later the transfer augers 102 and 115 kick in as does aspirator feed roller 62. Three seconds after this the feed system activates into bin 54. This bin has automatic high and low switches which control its feed auger. Three seconds after the feed system activates the monitoring system switches on, and monitors the rolling mill 124, air lock valve 108, fan 114, and cleaning machine 80 to sense loose drive belts and similar problems. There is a full hopper sensor on rolling mill hopper 122, when this is triggered, transfer augers 102, 115 and aspirator feed roller 62 shut down. Written pole motor 168 shuts down twenty seconds later to allow the rolling mill 124 to clean out, since the written pole motor cannot start it loaded.

Figure 12:
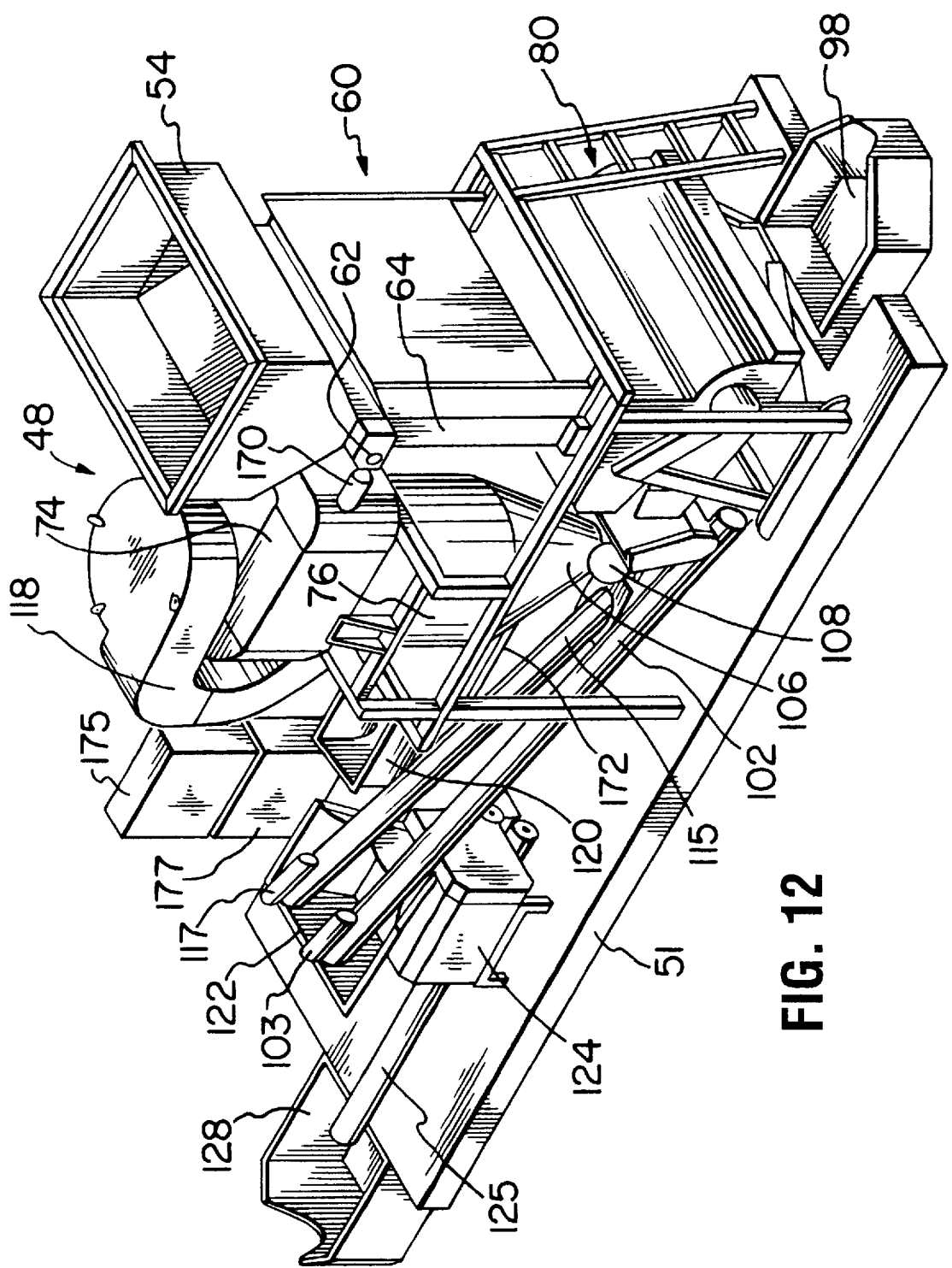
FIGS. 12 and 13 show perspective views of another embodiment of a yard plant cleaning and separating unit of the invention, combined with a seed crushing and chaff densifying unit, in this case the unit is stationary.
Figure 13:
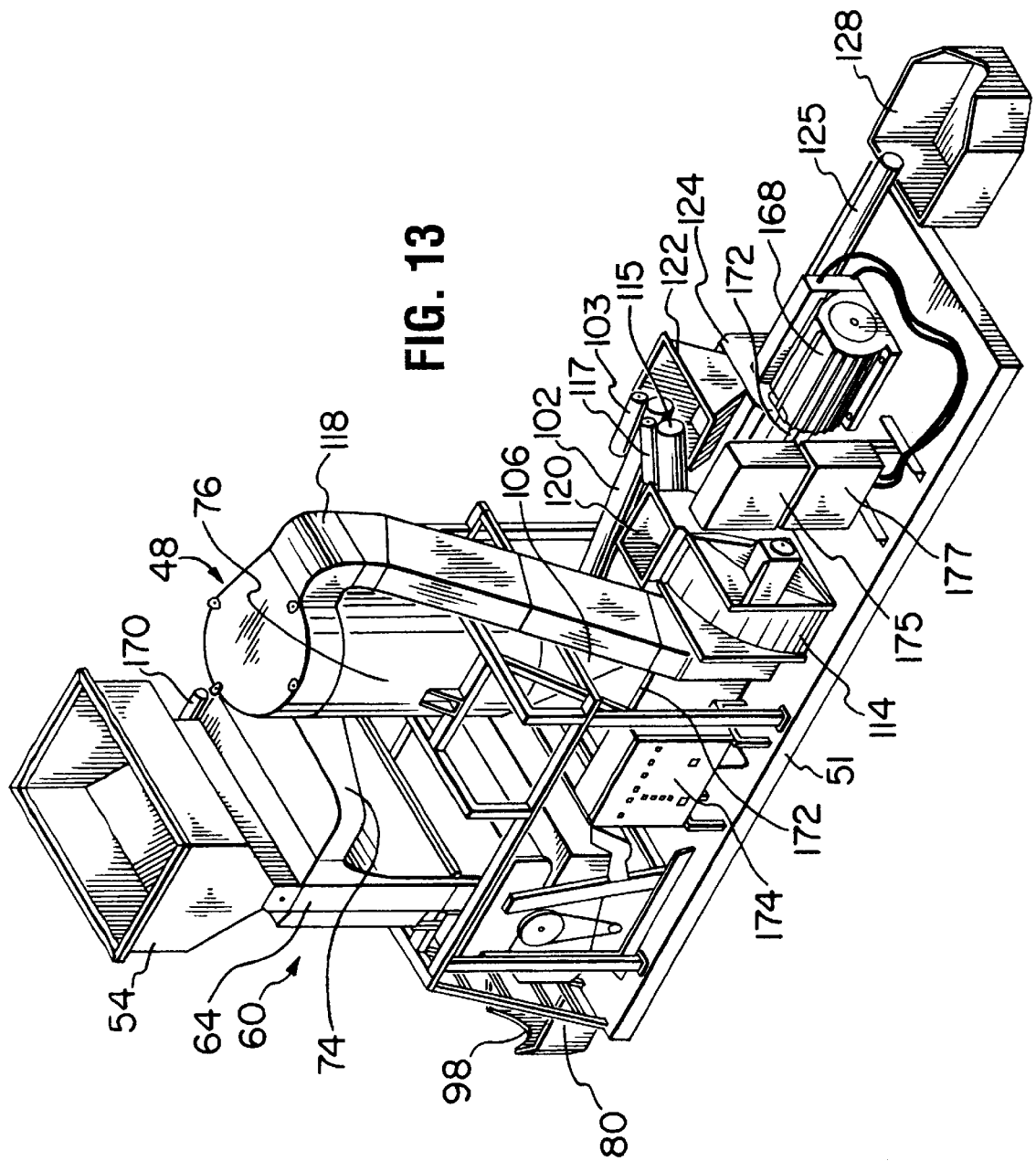

FIGS. 12 and 13 show a stationary version of yard plant 48, mounted on base 51. Grain is fed through grain feed inlet 54 into aspirator 60, which has top feed roll 62 controlled by feed roll motor 170, then through aspiration column 64 into grain cleaner 80. Clean grain is passed out into hopper 98. Matter cleaned from the grain by cleaner 88 passes into attachment 95 and thence into auger 102. The aspirated material from aspirator 60 passes via duct 74 into cyclone 76 where air forces it spiraling downward, and the centrifugal effect urges the chaff into the walls and down into cone 106. At the base of cone 106 the chaff passes through airlock valve 108 into auger 115. Centrifugal fan 114 through ducts 74 and 118 provides air for aspirator 60 and cyclone 76, it discharges through outlet 120. Augers 102 and 115 discharge the cleanings from the grain into hopper 122, which feeds into roller mill or hammer mill 124, either can be used. Mill 124 discharges via auger 125 into hopper 128. Auger motors 103 and 107 drive augers 102 and 115 respectively. Electric motor 168 and drive shaft 172 are utilized as in FIG. 7, to drive fan 114, airlock valve 108, and grain cleaner 80. When electric motor 168 is a written pole motor, it is preferably controlled by control boxes 175 and 177.

Figure 14:
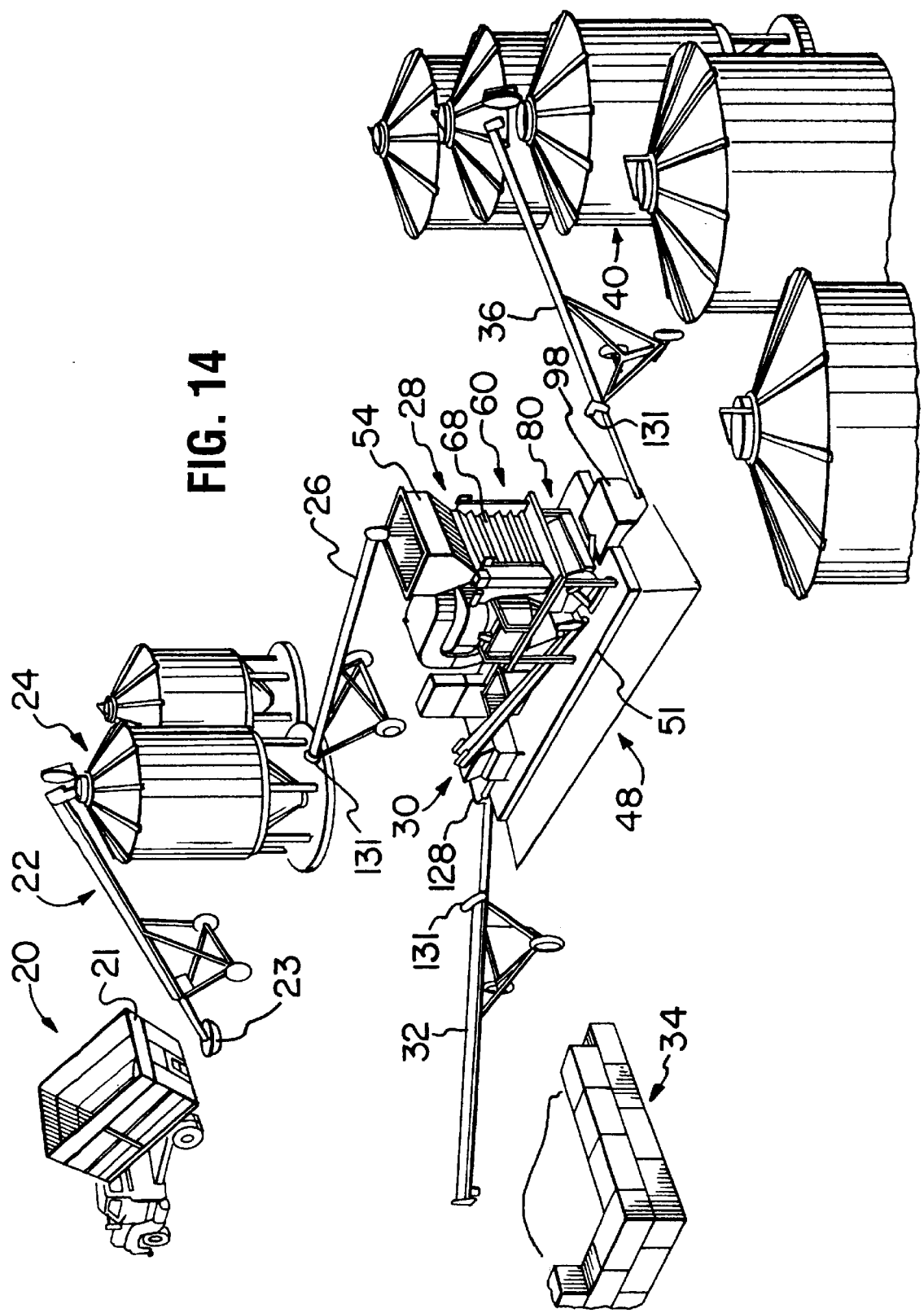
FIG. 14 shows the embodiment of FIGS. 12 and 13 set up in a farm yard.
Figure 15:
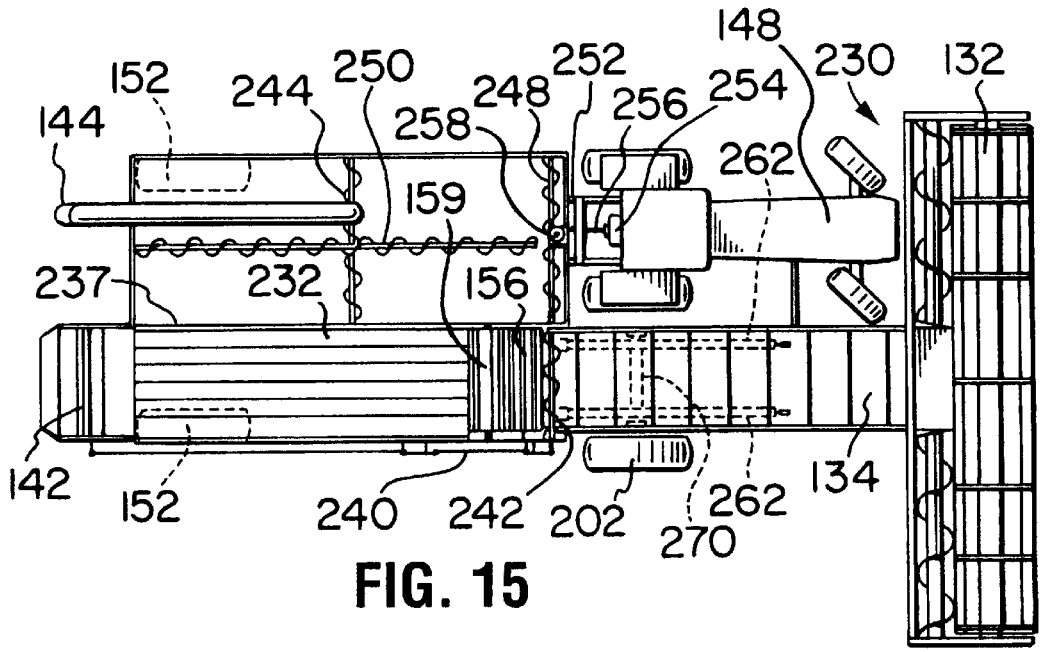
FIG. 15 shows a top part sectional view of another embodiment of a wrap-around thresher of the invention.
Figure 16:
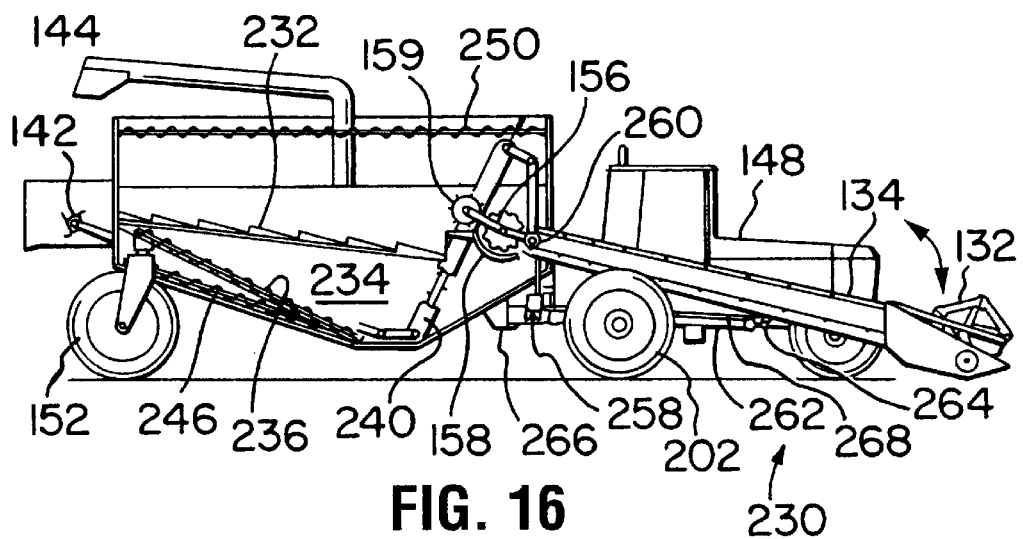
FIG. 16 shows a side part sectional view of the embodiment of FIG. 15.
Figure 17:
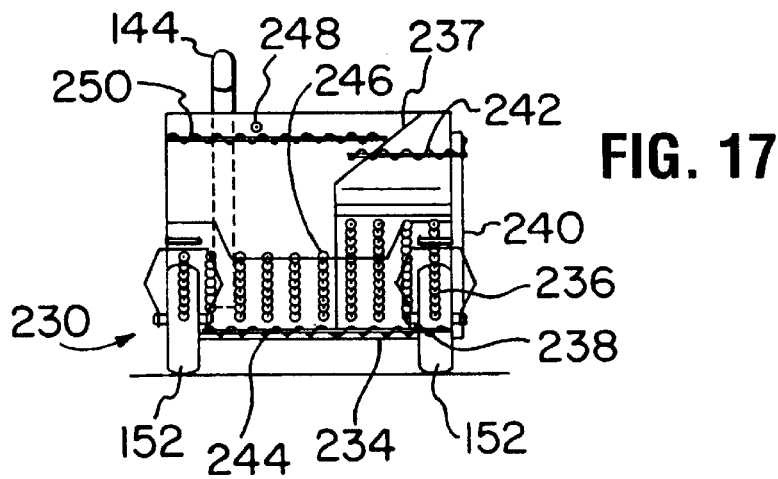
FIG. 17 shows a rear part sectional view of the embodiment of FIG. 16.

FIG. 14, shows yard plant 48 of FIGS. 12 and 13. Grain truck 20, preferably with raised sides 21, discharges into hopper 23, which is emptied by large grain auger 22, which typically have a 8, 10 or 13 inch diameter tube, into surge storage bin 24. Pencil auger 26 typically with a 4 inch diameter tube discharges grain steadily into yard plant 48 mounted on base 51. The grain is received by hopper 54 of cleaning machine 28, which includes aspirator 60, having air inlets 68, and cleaning machine 80. Cleaning machine 80 discharges clean grain into hopper 98, whence it is carried by pencil auger 26, typically with a 4 inch diameter tube, to storage bin 40. Material cleaned from the grain (chaff, grain leavings and weed seeds) is carried and passed through crushing, densifying and tearing machine 30, which includes milling machine 124, then to hopper 128, emptied by pencil auger 32, typically of 4 inch diameter tube, into chaff bunker 34. Pencil augers 26, 32, and 36 are operated by electrical motors 131, which are controlled through electric motor 168. That is when yard plant 48 is switched on these augers are running, so that as grain to be cleaned is moved into plant 48, clean grain and treated chaff, grain leavings and weed seeds are removed. Pencil augers are used, because large auger 22 has a delivery capacity, up to 9,000 bushels/hour or more, greater than the yard plant 48 can handle. Thus the grain truck is rapidly emptied into surge bin 24, which is then relatively slowly emptied through pencil auger 26 into yard plant 48. Pencil augers 32 and 36 may be controlled by sensors in hoppers 128 and 98 respectively, so that these augers are only switched on when there is material in the hoppers. Yard plant 46 can be varied in size without affecting the principles or results involved as those skilled in the art are aware.

Wheat was harvested by a combine with its shoe and aspirator switched off to yield a mixture of chaff, grain, grain leavings, weed seeds and some straw, which was visibly exceptionally dirty. This wheat mixture was then passed through prototype yard plant 46, the version shown in FIG. 3 using a single rotary shaft driven by a written pole motor using a single phase electric power supply. The capacity of the system is 300 bushels per hour of wheat mixture, which could be easily enlarged to 600 bushels per hour. The resulting wheat grain was commercial export grade formally rated at 1% grain dockage, which is the minimum grain dockage recognized. That is it was a maximum value for material other than grain is 1% of the cleaned grain. Similar harvesting and treatment of barley produced closely similar results. The milled wheat chaff, wheat grain leavings and weed seeds mixture was inspected by nutritional experts and considered vastly superior to available wheat chaff as animal feed. Similarly the milled barley chaff, barley leavings and weed seeds mixture was inspected by nutritional experts and considered vastly superior to available barley chaff as animal feed. Current grain cleaning systems handle combine cleaned grain to approximately the same level of dockage. Thus the yard plant cleans grain to commercial export standards in a single operation, compared to the two separate operations (combine and cleaning plant) required at present.

The entire yard plant 46 as well as yard cleaning machine 28 and seed crushing and chaff densifying and tearing machine 30 are suitably entirely automated, and can use electrical power, which is more energy efficient than mobile combine cleaning machines which are fossil fuel powered. Automatic yard plant 46 is intended to utilize as much existing farm equipment as possible to aid in conversion of former harvesting systems to the harvesting system described herein. Automatic yard plant 46 besides producing more and cleaner grain, also produces densified chaff and crushed weed seeds both of which contain fat and protein. Untreated chaff has a nutritional value between that of straw (low) and hay (high), cattle prefer it to straw. One estimate gives it 75% of the nutritional value of tame hay (equivalent to alfalfa mixed). Ammoniation can substantially increase its nutritional value. Although chaff is a known animal feed, the current method of collecting is expensive and awkward (chaff wagons). Collecting it as part of the harvesting process is much more efficient. The nutrients of the crushed weed seeds enhance the nutritional value of the chaff. Unless the weed seeds are crushed they will pass undigested through the animal's digestive tract.

The removal of chaff, grain leavings and weed seeds and the reduction of grain loss on the fields will reduce weed and volunteer grain growth. Because weed and volunteer grain growth is reduced pesticide and herbicide use is also reduced, which in turn reduces unwanted chemical environmental effects. The absence of chaff will aid zero-till planting. As it eliminates chaff rows, which interfere with seeding. It will also reduce fertilizer use, as it eliminates chaff clumps and rows on the field, which act as barriers for fertilizer to penetrate the soil. Chaff contributes little to soil nutrition, so its removal causes little loss in soil nitrogen and nutrition, compared to straw. The presence of chaff tends to interfere with germination of subsequent crops. Furthermore the use of chaff-weed seed as cattle feed will result in increased availability of manure for fertilizer.

The system is designed to harvest all prairie crops including cereal crops, oil seeds, and legumes, including mustard, lentils and beans, to support modern crop rotational methods.

The economic value of the method was assessed to be:

| Capital savings | |
|---|---|
| Harvesting Equipment Savings | US $35,000 |
| Operational savings | |
| Chaff collection (wheat) | US $7.35/acre |
| Chaff collection (barley) | US $4.80/acre |
| Chaff collection (canola) | US $8.05/acre |
| Weed collection (less herbicide) | US $3.70/acre |
| Additional grain (less loss) | US $2.45/acre |
| Cleaner grain (less dockage) | US $0.55/acre |
| TOTAL SAVINGS (WHEAT) | US $14.05/acre |

These figures are conservative since they are based on the estimated market value of currently collected conventional combine chaff. The milled chaff, grain leavings and weeds seeds product of the new method, both wheat and barley, has been inspected by experts, and pronounced of better quality to conventional chaff, as they are much richer in starch, protein and fat.

As those skilled in the art would realize these preferred described details and materials and components can be subjected to substantial variation, modification, change, alteration, and substitution without affecting or modifying the function of the described embodiments.

Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. A method of harvesting a field crop, comprising
cutting a field crop from an area of land,
threshing said cut field crop to produce a threshed crop containing straw, grain, chaff, grain leavings and weed seeds,
separating said threshed crop into two portions, a first portion including substantially all of the straw from the threshed crop, and a second portion including substantially all of the chaff, grain, grain leavings and weed seeds from the threshed crop,
returning said first portion to said area of land, and
transporting said second portion from said area of land.

2. A method of separating grain components to produce a grain portion and a residue portion, comprising
obtaining a substantially straw-free harvested and threshed grain product containing grain, chaff, grain leavings, and weed seeds, from an area of land, and separating said product at a location remote from said area of land into a grain portion containing substantially all of the grain from said product, and a residue portion containing substantially all of the chaff, grain leavings, and weed seeds from said product.

3. A method of harvesting field crops, comprising:
cutting a field crop from an area of land,
threshing said cut field crop to produce a threshed crop containing straw, grain, chaff, grain leavings and weed seeds,
separating said threshed crop into two portions, a first portion including substantially all of the straw from the threshed crop, and a second portion including substantially all of the chaff, grain, grain leavings and weed seeds from the threshed crop,
returning said first portion to said area of land,
transporting said second portion to a location remote from said area of land, and
separating said second portion at said remote location into a grain portion containing substantially all of the grain from the second portion, and a residue portion containing substantially all of the chaff, grain leavings, and weed seeds from said second portion.

4. Method of claim 3, comprising the subsequent step of treating said chaff, grain leavings and weed seeds portion with anhydrous ammonia.

5. Method of claim 3, comprising the subsequent step of treating said residue portion, to tear and compact said chaff, and crush and compact said grain leavings and weed seeds.

6. Method of claim 5, comprising the subsequent step of treating said torn and compacted chaff together with said crushed and compacted grain leavings and weed seeds with anhydrous ammonia.

7. Method of claim 3 comprising threshing said cut crop and separating said threshed crop into said two portions in a mobile harvester, and
separating said second portion into said grain portion and said residue portion in a separation plant at said remote location.

8. Method of claim 7, comprising the subsequent step of treating said residue portion with anhydrous ammonia.

9. Method of claim 7, comprising the subsequent step of treating said residue portion, to tear and compact said chaff, and crush and compact said grain leavings and weed seeds.

10. Method of claim 9, comprising the subsequent step of treating said torn and compacted chaff together with said crushed and compacted grain leavings and weed seeds with anhydrous ammonia.

11. Method of obtaining an animal feed comprising the steps of
obtaining a portion of a harvested field crop containing substantially all chaff, grain leavings and weed seeds of said crop, and
treating said chaff, grain leavings and weed seeds portion by tearing and compacting said chaff and crushing and compacting said grain leavings and weed seeds to produce a mixture of torn and compacted chaff and crushed and compacted grain leavings and weed seeds suitable as an animal feed.

12. Method of claim 11, wherein
said chaff, grain leavings and weed seeds portion is treated by milling, thereby tearing and compacting said chaff and crushing and compacting said grain leavings and weed seeds.

13. Method of claim 12, comprising the step of
adding grain to said chaff, grain leavings and weed seeds portion to enrich said chaff, grain leavings and weed seeds portion, before milling the resulting mixture.

14. Method of claim 12, wherein said chaff, grain leavings and weed seeds portion is obtained by separating a cut threshed crop comprising chaff, grain, grain leavings, straw and weed seeds into two portions, a straw portion including substantially all said straw, and a chaff, grain, grain leavings and weed seed portion including substantially all said chaff, grain, grain leavings and weed seeds and separating said chaff, grain, grain leavings and weed seeds portion into two portions, a grain portion including substantially all said grain, and a chaff, grain leavings and weed seeds portion including substantially all said chaff, grain leavings and weed seeds.

15. Method of claim 14, including the prior step of threshing said cut field crop.

16. Method of claim 11, comprising the subsequent step of treating said mixture with anhydrous ammonia.

17. Animal feed comprising torn and compacted chaff, and crushed and compacted grain leavings and weed seeds treated with anhydrous ammonia, produced by the method of claim 16.

18. Animal feed comprising torn and compacted chaff, and crushed and compacted grain leavings and weed seeds, produced by the method of claim 11.

\* \* \* \* \*